US010311111B2

(12) United States Patent
Chigusa et al.

(10) Patent No.: US 10,311,111 B2
(45) Date of Patent: Jun. 4, 2019

(54) SEARCH METHOD AND APPARATUS AND STORAGE MEDIUM

(71) Applicant: Hitachi, Ltd., Tokyo (JP)

(72) Inventors: Kentarou Chigusa, Tokyo (JP); Masashi Tsuchida, Tokyo (JP); Yukio Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 15/129,483

(22) PCT Filed: May 30, 2014

(86) PCT No.: PCT/JP2014/064455
§ 371 (c)(1),
(2) Date: Sep. 27, 2016

(87) PCT Pub. No.: WO2015/181962
PCT Pub. Date: Dec. 3, 2015

(65) Prior Publication Data
US 2017/0116189 A1    Apr. 27, 2017

(51) Int. Cl.
*G06F 17/30* (2006.01)
*G06F 16/93* (2019.01)
(Continued)

(52) U.S. Cl.
CPC .......... *G06F 16/93* (2019.01); *G06F 16/2474* (2019.01); *G06F 16/3331* (2019.01)

(58) Field of Classification Search
CPC ............... G06F 17/30; G06F 17/30011; G06F 17/30548; G06F 16/93; G06F 16/2474; G06F 16/3331
(Continued)

(56) References Cited

U.S. PATENT DOCUMENTS

2013/0238601 A1* 9/2013 Kanemoto ........ G06F 17/30699
707/722
2016/0239559 A1* 8/2016 Morimoto ......... G06F 17/30705

FOREIGN PATENT DOCUMENTS

JP    2000-276487 A    10/2000
JP    2002-230005 A    8/2002
(Continued)

OTHER PUBLICATIONS

International Search Report of PCT/JP2014/064455 dated Aug. 12, 2014.

*Primary Examiner* — Isaac M Woo
(74) *Attorney, Agent, or Firm* — Mattingly & Malur, PC

(57) ABSTRACT

A search method and apparatus, and storage medium capable of enhancing response accuracy of a search result is proposed. A search apparatus for searching among a plurality of conversation history documents, each of which includes an inquiry from a customer and a response to the inquiry, for the conversation history documents whose content of the inquiry is similar to an inquiry text representing content of a new inquiry from the customer: classifies the plurality of conversation history documents into a plurality of clusters according to content of the conversation history documents; extracts a conversation history document representative of each of the clusters as a representative document for the relevant cluster; and searches for the conversation history documents having a relation with the inquiry text and presents the representative document for the cluster, to which the conversation history documents detected by the search belong, as a result of the search.

10 Claims, 22 Drawing Sheets

(51) Int. Cl.
*G06F 16/2458* (2019.01)
*G06F 16/33* (2019.01)

(58) Field of Classification Search
USPC .................................................. 707/600–899
See application file for complete search history.

(56) References Cited

FOREIGN PATENT DOCUMENTS

| | | | |
|---|---|---|---|
| JP | 2004-102407 A | 4/2004 |
| JP | 2007-304793 A | 11/2007 |
| JP | 2011-170583 A | 9/2011 |

\* cited by examiner

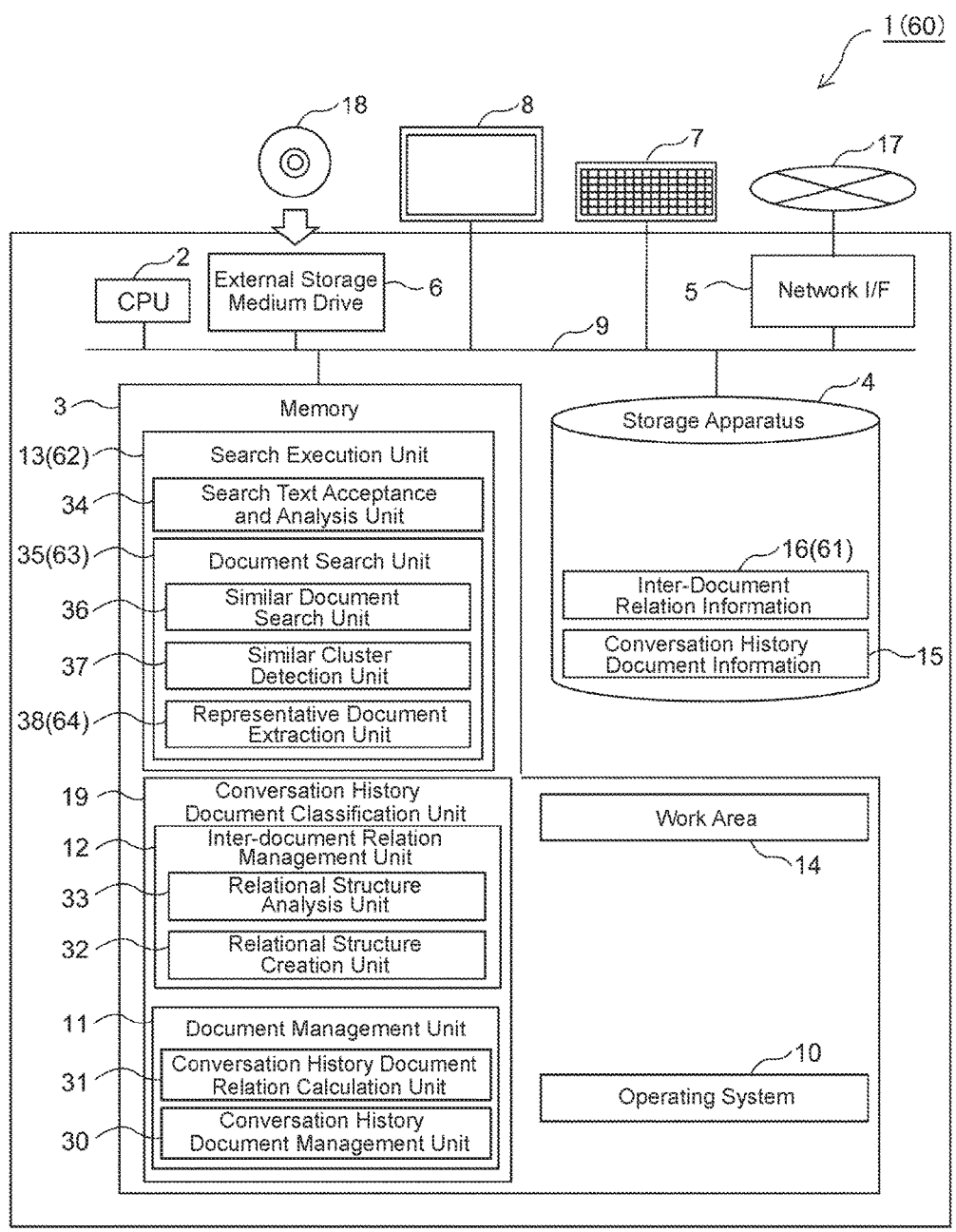

FIG.2

Server machine HB-2330 used for a personnel management system of ABC Bank failed to complete backup within normal hours yesterday and today, so we would like to ask you to check this.
--------
Dear Mr. Yamada, System Administrator of ABC Bank
Thank you for your inquiry.
(Omitted)
Please send a log of the server machine HB-2330 to the following e-mail address.
toiawase@aaa.bbb.co.jp
(Omitted)
Thank you.
\*\*\*
Suzuki, Support Service Officer of Company bbb
\*\*\*
--------
Dear Mr. Suzuki of Company bbb, This is Yamada of ABC Bank.
(Omitted)
I'm sending the log of the server machine.
(Omitted)
--------
Dear Mr. Yamada, System Administrator of ABC Bank
Thank you for your ongoing support.
This is Suzuki of Company bbb.
(Omitted)
Regarding the backup of the server machine HB-2330 which you inquired about, we found as a result of analysis of the log that a failure of main board B for the server machine HB-2330 had occurred.
(Omitted)

Server HB-2330 for an in-house system of DEF Securities Company failed to complete backup yesterday during night-time business-closed hours.
———————
Dear Mr. Suzuki, System Administrator of DEF Securities Company
Thank you for your inquiry.
(Omitted)
Please send a log of the server machine HB-2330 to the following e-mail address.
toiawase@aaa.bbb.co.jp
(Omitted)
Thank you.
\*\*\*
Saito, Support Service Officer of Company bbb
\*\*\*
———————
Dear Mr. Saito of Company bbb
Thank you for your support.
This is Suzuki of DEF Securities Company.
(Omitted)
I'm sending the log of the server machine.
(Omitted)
———————
Dear Mr. Suzuki
Information System Department, DEF Securities Company
Thank you for your ongoing support.
This is Saito of Company bbb.
(Omitted)
Regarding the backup of the server machine HB-2330 which you inquired about, we found as a result of analysis of the log that a failure of connection port X for the server machine HB-2330 had occurred.
(Omitted)

Server HB-2330 for an in-house system of XYZ Bank failed to complete backup yesterday during night-time business-closed hours.

---

Dear Mr. Tanaka, System Administrator of XYZ Bank
(Omitted)
Regarding the subject matter of your inquiry, failures of the following components/device might have possibly occurred:
· a main board for the server;
· a connection port with a backup apparatus; and
· the backup apparatus.

We will examine the matter, so please send us the following files:

(1) a set of files under directory XXX;
(2) a set of files under directory YYY;
(3) a set of files under directory ZZZ; and
(4) logs output from backup apparatus monitoring software AAA.

(Omitted)
The above files should be sent to the following e-mail address.
toiawase@aaa.bbb.co.jp
(Omitted)
Thank you.
\*\*\*
Yamamoto, Support Service Officer of Company bbb
\*\*\*

---

Dear Mr. Yamamoto of Company bbb
Thank you for your support.
This is Suzuki of XYZ Bank.
(Omitted)
I'm sending the log of the server machine
(Omitted)

---

(Omitted)

---

Dear Mr. Tanaka of DEF Bank
Thank you for your ongoing support.
This is Yamamoto of Company bbb.
(Omitted)
Regarding the backup of the server machine HB-2330 which you inquired about, we found as a result of analysis of the log that a failure of connection port X for the server machine HB-2330 had occurred.
(Omitted)

FIG.8

| Edge ID | Start Node ID | End Node ID | Cluster # |
|---|---|---|---|
| a | 2 | 1 | 1 |
| b | 3 | 2 | 1 |
| c | 4 | 1 | 1 |
| d | 5 | 1 | 1 |
| e | 6 | 2 | 1 |
| f | 9 | 1 | 1 |
| g | 9 | 8 | 2 |
| h | 8 | 7 | 2 |
| i | 10 | 7 | 2 |
| j | 11 | 8 | 2 |
| k | 12 | 7 | 2 |
| l | 12 | 8 | 2 |
| m | 12 | 10 | 2 |

| Document ID | Similarity Score |
|---|---|
| 20140131_0231 | 5 |
| 20140131_0230 | 77 |
| . . . | . . . |
| 20130512_0114 | 26 |
| . . . | . . . |
| 20121224_0008 | 80 |
| . . . | . . . |
| 20100401_0001 | 45 |

| Edge ID | Start Node ID | End Node ID | Cluster # | Weight |
|---|---|---|---|---|
| a | 2 | 1 | 1 | 1 |
| b | 3 | 2 | 1 | 0 |
| c | 4 | 1 | 1 | 3 |
| d | 5 | 1 | 1 | 1 |
| e | 5 | 2 | 1 | 1 |
| f | 6 | 2 | 1 | 2 |
| g | 9 | 1 | 1 | 1 |
| h | 9 | 8 | 2 | 1 |
| i | 8 | 7 | 2 | 1 |
| j | 10 | 7 | 2 | 1 |
| k | 11 | 8 | 2 | 2 |
| l | 12 | 7 | 2 | 2 |
| m | 12 | 8 | 2 | 1 |
| n | 12 | 10 | 2 | 1 |
| 61A | 61B | 61C | 61D | 61E |

FIG.16

| Document ID | Reference Frequency |
|---|---|
| 20140131_0232 | 17 |
| 20140131_0231 | 3 |
| . . . | . . . |
| 20131115_0085 | 0 |
| . . . | . . . |
| 20131005_0002 | 5 |
| . . . | . . . |
| 20111121_0191 | 3 |

| Document ID | Centrality within Cluster |
|---|---|
| 20140231_0232 | 0.78 |
| 20131005_0002 | 0.81 |
| 20131115_0085 | 0.66 |
| ... | ... |

FIG.19

| Document ID | Centrality within Cluster |
|---|---|
| 20140231_0232 | 0.91 |
| 20131005_0002 | 0.85 |
| 20131115_0085 | 0.66 |
| ... | ... |

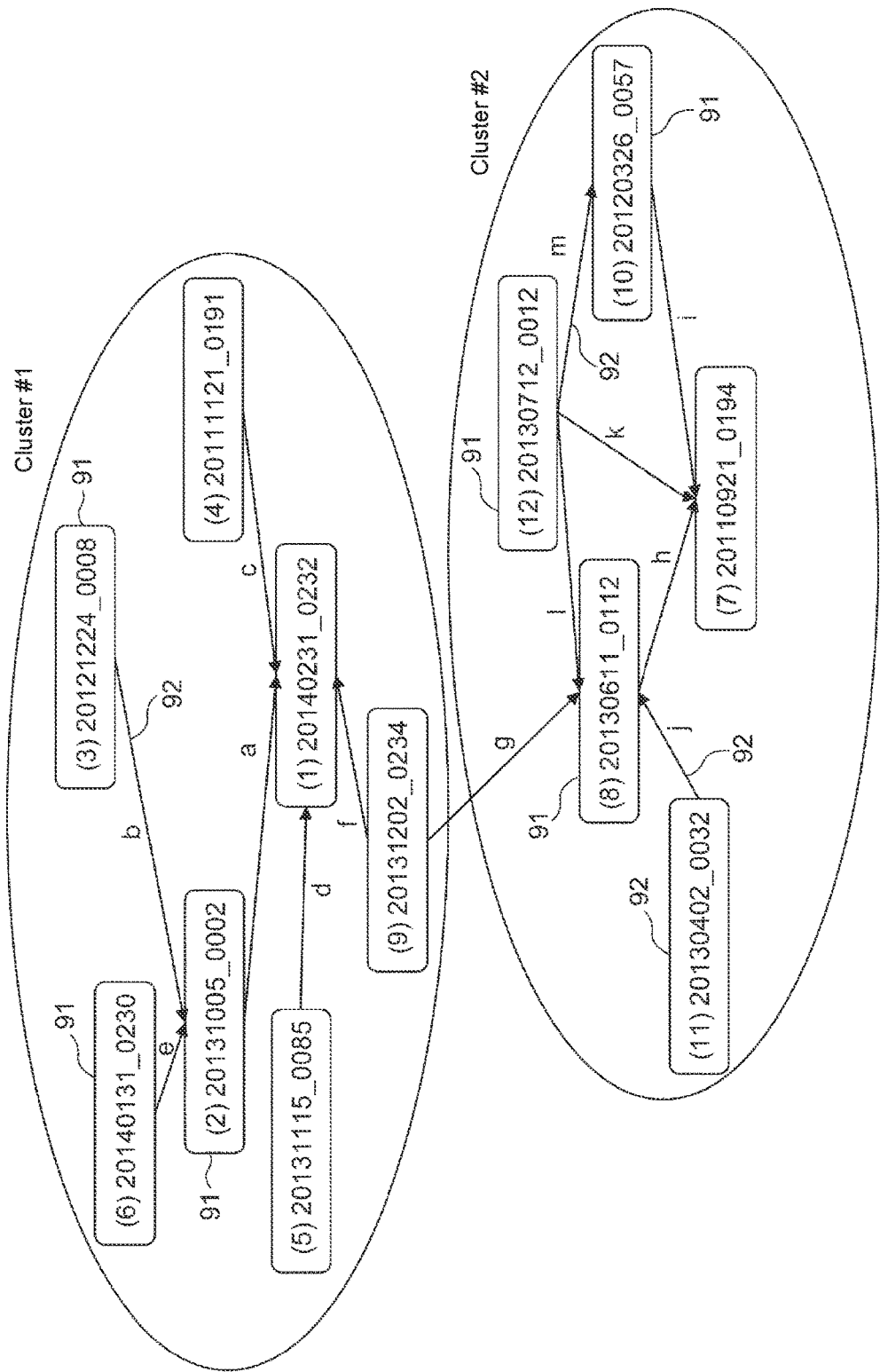

SEARCH METHOD AND APPARATUS AND STORAGE MEDIUM

TECHNICAL FIELD

The present invention relates to a search method and apparatus and a storage medium and is suited for use in, for example, a search apparatus for searching among past conversation history documents for conversation history documents whose content is similar to an inquiry from a customer when preparing a response to the inquiry at a call center or the like.

BACKGROUND ART

There are cases where contact with a customer is recorded and the recorded content is analyzed and utilized for, for example, customer care and product development thereafter. Although there have already been such cases, attention has been drawn to analysis and utilization of documents in which all exchanges of communications between customers and call centers that accept inquiries about products from the customers are recorded (texts including all inquiries, interim status, and final responses and hereinafter referred to as the conversation history document) as an example of utilization of big data. For example, the above-mentioned call centers use past conversation history documents when finding an appropriate solution for a new inquiry.

CITATION LIST

Patent Literature

[Patent Literature 1] Japanese Patent Application Laid-Open Publication No. 2007-304793

SUMMARY OF THE INVENTION

Problems to be Solved by the Invention

Meanwhile, when preparing a response to a new inquiry from a customer, a problem-solving clerk at a call center or the like firstly inputs, for example, keywords to a search system or the like and searches past conversation history documents including such keywords in order to find similar cases, as reference for the response, in the past conversation history documents. Next, the problem-solving clerk reads the details of the past conversation history documents which seem to be similar on the basis of the search results. Then, the problem-solving clerk conducts a history lookup process to judge whether the read conversation history documents are useful for the new inquiry or not.

In a search process of them, the past similar conversation history documents are searched by using, for example, a system and whether or not there are any conversation history documents which are effective for preparation of the response is judged on the basis of the search results in subsequent check process, selection process, and judgment process. If any conversation history documents which can be used as reference for the new inquiry exist as a result of the judgment, the response is prepared by referring to such conversation history documents; however, if such conversation history documents do not exist, the aforementioned history lookup process is executed again by, for example, changing search conditions.

In order to prepare an effective response to an inquiry from a customer in a short time, it is desirable to reduce the number of executions of this history lookup process. Then, it is desirable to enhance accuracy of responses of the search results in order to reduce the number of executions of the history lookup process.

In this case, inventions which aim to reduce the number of executions of such history lookup process have conventionally existed. For example, it is an object of PTL 1 to omit the search process by a problem-solving clerk and shorten the history lookup process itself by mechanically extracting keywords from the content of communications exchanged between the problem-solving clerk and a customer and searching past conversation history documents including such keywords.

However, if such conventional technique is used, the response accuracy of the search result will depend on an expression form of the content of communications exchanged between the problem-solving clerk and the customer. Specifically speaking, the documents including the extracted keywords are searched according to the technique disclosed in PTL 1. Thus, even if these documents are past histories deeply related to the inquiry content, hits will not be obtained as a result of the search unless the keywords match or are similar; and as a result, the history lookup process will be executed again.

The present invention was devised in consideration of the above-described circumstances and aims at proposing a search method and apparatus and storage medium capable of enhancing response accuracy of a search result.

Means to Solve the Problems

In order to solve the above-described problems, provided according to the present invention is a search method executed by a search apparatus for searching among a plurality of conversation history documents, each of which includes an inquiry from a customer and a response to the inquiry, for the conversation history documents whose content of the inquiry is similar to an inquiry text representing content of a new inquiry from the customer, wherein the search method includes: a first step executed by the search apparatus classifying the plurality of conversation history documents into a plurality of clusters in accordance with contents; a second step executed by the search apparatus extracting a conversation history document representative of each of the clusters as a representative document for the relevant cluster; and a third step executed by the search apparatus searching for the conversation history documents having a relation with the inquiry text and presenting the representative document for the cluster, to which the conversation history documents detected by the search belong, as a result of the search.

Furthermore, provided according to the present invention is a search apparatus for searching among a plurality of conversation history documents, each of which includes an inquiry from a customer and a response to the inquiry, for the conversation history documents whose content of the inquiry is similar to an inquiry text representing content of a new inquiry from the customer, wherein the search apparatus includes: a conversation history document classification unit that classifies the plurality of conversation history documents into a plurality of clusters in accordance with contents; a representative document extraction unit that extracts a conversation history document representative of each of the clusters as a representative document for the relevant cluster; and a document search unit that searches for the conversation history documents having a relation with the inquiry text and presents the representative document for the cluster, to which the conversation history documents detected by the search belong, as a result of the search.

Furthermore, provided according to the present invention is a storage medium storing a program to be executed by a search apparatus for searching among a plurality of conversation history documents, each of which includes an inquiry from a customer and a response to the inquiry, for the conversation history documents whose content of the inquiry is similar to an inquiry text representing content of a new inquiry from the customer, wherein the program causes the search apparatus to execute processing including: a first step of classifying the plurality of conversation history documents into a plurality of clusters in accordance with contents; a second step of extracting a conversation history document representative of each of the clusters as a representative document for the relevant cluster; and a third step of searching for the conversation history documents having a relation with the inquiry text and presenting the representative document for the cluster, to which the conversation history documents detected by the search belong, as a result of the search.

When this search method and this search apparatus, and the program stored in this storage medium are used, a representative document for a cluster, to which the conversation history documents having the relation with the inquiry text belong, is presented. Therefore, the conversation history document with the inquiry content deeply related to the inquiry text can be presented without depending on, for example, the expression form of the inquiry content of the inquiry text.

Advantageous Effects of the Invention

A search method and apparatus, and storage medium capable of enhancing response accuracy of a search result can be implemented according to the present invention.

BRIEF DESCRIPTION OF DRAWINGS

FIG. 1 is a block diagram illustrating an overall configuration of a search apparatus according to first and second embodiments;

FIG. 2 is a diagram illustrating a configuration example of a conversation history document;

FIG. 3 is a diagram illustrating a configuration example of a conversation history document;

FIG. 4 is a diagram illustrating a configuration example of a conversation history document;

FIG. 8 is a conceptual diagram illustrating a configuration example of inter-document relation information;

FIG. 10 is a conceptual diagram illustrating a configuration example of a similarity score list;

FIG. 13 is a conceptual diagram illustrating inter-document relation information according to a second embodiment;

FIG. 16 is a conceptual diagram illustrating a configuration example of reference history information;

FIG. 18 is a chart for explaining the inter-conversation-history-document relation creation processing according to the third embodiment;

FIG. 19 is a chart for explaining the inter-conversation-history-document relation creation processing according to the third embodiment;

FIG. 23 is a conceptual diagram for explaining another embodiment.

DESCRIPTION OF EMBODIMENTS

Figure 5:
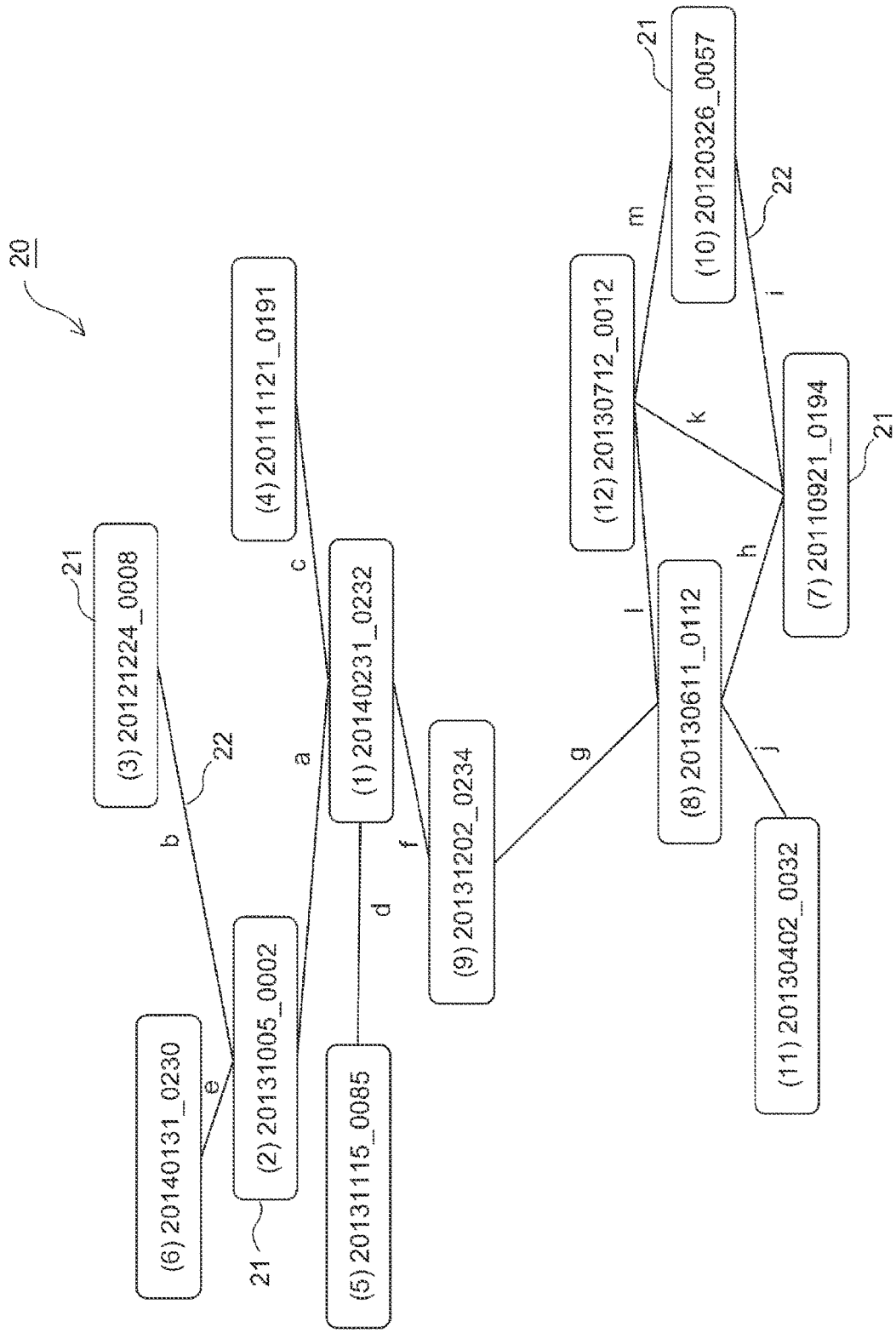
FIG. 5 is a conceptual diagram illustrating a configuration example of a graph.

An embodiment of the present invention will be described below in detail with reference to drawings.

(1) First Embodiment (1-1) Configuration of Search Apparatus According to this Embodiment Referring to FIG. 1, the reference numeral 1 represents a search apparatus according to this embodiment as a whole. This search apparatus 1 is configured by including a CPU (Central Processing Unit) 2, a memory 3, a storage apparatus 4, a network interface 5, an external storage media drive 6, an input device 7, and a display device 8 and they are connected to each other via an internal bus 9.

The CPU 2 is a processor for controlling the entire search apparatus 1 as a whole. Moreover, the memory 3 is configured of, for example, a volatile semiconductor memory and is used to retain various kinds of programs such as an operating system (OS: Operating System) 10. A document management unit 11, an inter-document relation management unit 12, and a search execution unit 13 which will be described later are also stored and retained in this memory 3. Furthermore, the memory 3 is also used as a work memory for the CPU 2. Therefore, the memory 3 is provided with a work area 14 to be used when the CPU 2 executes each processing.

The storage apparatus 4 is configured of, for example, hard disk drives or SSDs (Solid State Drives) and is used to save programs and data for a long period of time. In a case of this embodiment, the storage apparatus 4 stores, for example, conversation history document information 15 including all past conversation history documents, and an inter-document relation information 16 described later.

Incidentally, the "conversation history document(s)" in this embodiment is a document(s) (text(s)) which includes an inquiry text representing the content of an inquiry from a customer and a response to the inquiry, records the following items as an example on an inquiry case basis, and includes the following content:

1. an inquiry (communication content from a customer to a person in charge such as an operator at a call center);
2. an application log or system log collection request (communication content from the person in charge to the customer):
3. logs (communication content from the customer to the person in charge):
4. a research request (communication content from the person in charge to a product department);
5. a research response (communication content from the product department to the person in charge); and
6. a final answer (communication content from the person in charge to the customer).

Furthermore, the conversation history documents may sometimes include confirmation, questions, and/or requests from the person in charge about the inquiry, and the customer's response about such confirmation, questions, and/or requests. Furthermore, regarding the conversation history documents, one conversation history document may sometimes include a plurality of inquiries and a plurality of responses. FIG. 2 to FIG. 4 illustrate configuration examples of such conversation history documents.

The network interface 5 is configured of, for example, an NIC (Network Interface Card) and performs protocol control upon communications with other communication devices via a network 17. Moreover, the external storage media drive 6 is a drive for a portable storage medium 18, such as a disk medium like a CD (Compact Disk) or a DVD (Digital Versatile Disk) or a semiconductor memory card like an SD card, and reads data from, and writes data to, the mounted storage medium 18.

The input device 7 is configured of, for example, a keyboard and a mouse and is used by a user to input various kinds of information and commands. Moreover, the display device 8 is configured of, for example, a liquid crystal display device and is used to display various kinds of information and various GUIs (Graphical User Interfaces).

(1-2) Various Functions Mounted on Search Apparatus

Next, various functions regarding data search, which are mounted on this search apparatus 1, will be explained. This search apparatus 1 is equipped with an inter-conversation-history-document relation creation function that classifies past conversation history documents into a plurality of clusters according to their content and extracts a conversation history document which is representative of the relevant cluster (hereinafter referred to as the representative document), with respect to each cluster.

Practically, this search apparatus 1 retains all past conversation history documents as the conversation history document information 15 in the storage apparatus 4. Then, the search apparatus 1 compares character components included in the relevant conversation history documents between the conversation history documents included in the conversation history document information 15 stored in the storage apparatus 4 (so-called a "concept search") regularly (for example, weekly or monthly) or irregularly according to the user's instruction input via the input device 7 and calculates a degree of similarity between the respective conversation history documents as a numerical value. In the following explanation, this numerical value will be referred to as the similarity score.

Furthermore, the search apparatus 1 creates a relation structure between the conversation history documents whose calculated similarity score is equal to or higher than a preset threshold value (hereinafter referred to as the similarity score threshold value). In a case of this embodiment, the search apparatus 1 creates, for example, a graph 20 as illustrated in FIG. 5 as the relation structure between the conversation history documents. This graph 20 is formed by connecting nodes 21 representing the conversation history documents whose similarity score is equal to or higher than the similarity score threshold value, with lines called edges 22.

Figure 6:
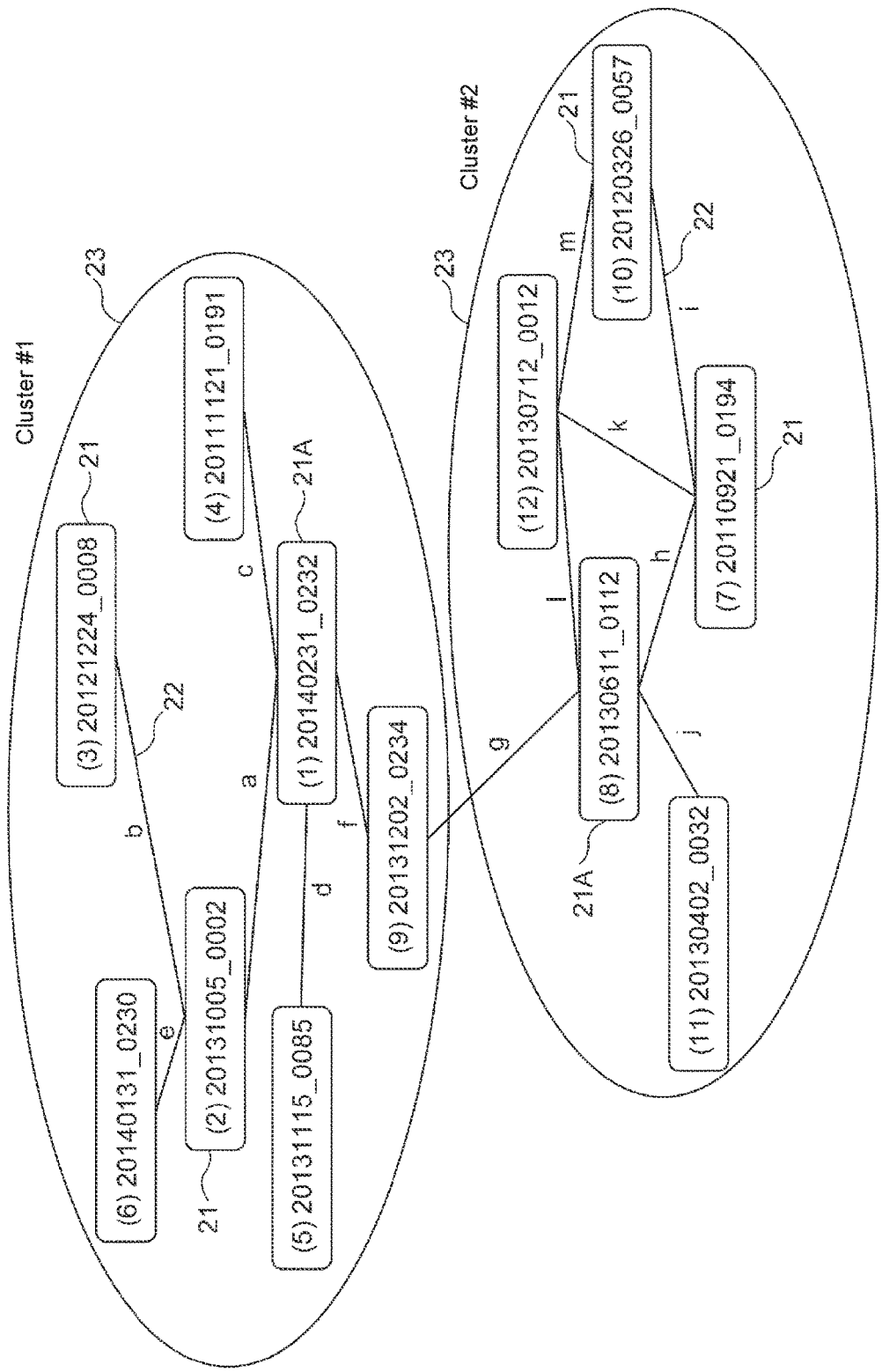
FIG. 6 is a conceptual diagram for explaining clusters.

Furthermore, the search apparatus 1 classifies all the conversation history documents included in the conversation history document information 15 into a plurality of clusters 23 as illustrated in FIG. 6 by classifying the thus-created graph 20 on the basis of each feature of character strings included in each conversation history document, that is, by performing so-called clustering. Subsequently, the search apparatus 1 extracts one conversation history document, as a representative document, from the conversation history documents belonging to the relevant cluster 23 with respect to the individual clusters 23.

Figure 7:
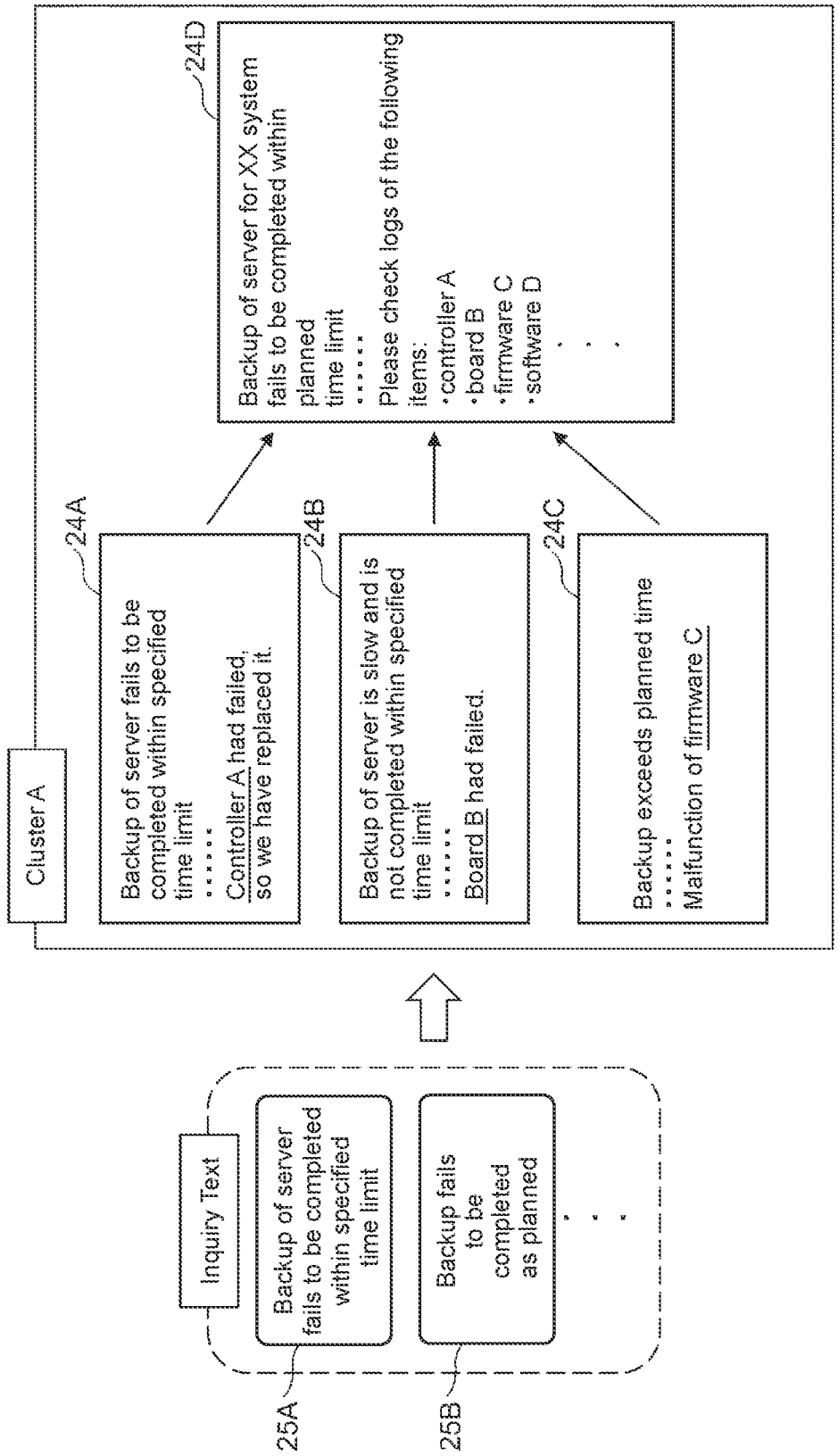
FIG. 7 is a conceptual diagram for explaining a representative document.

The "representative document" herein used in this embodiment indicates a conversation history document whose calculated value representing the relation with other conversation history documents within the relevant cluster is high (that is, whose relation number with other conversation history documents is the highest within the relevant cluster in this embodiment). For example, if a conversation history document including responses described in a larger number of conversation history documents within the relevant cluster exists among the conversation history documents belonging to the cluster, that conversation history document becomes a representative document for the cluster. Specifically speaking, when only four conversation history documents 24A to 24D as illustrated in FIG. 7 belong to a certain cluster, the conversation history document 24D including responses which are respectively described in the conversation history documents 24A to 24C becomes a representative document for the cluster.

Meanwhile, when an instruction is issued to search for a response example to an inquiry from a customer, the search apparatus 1 is also equipped with a conversation history document search function that searches for conversation history documents about inquiries whose content is similar to the content of the relevant inquiry, and presents, for example, a representative document for a cluster to which the relevant conversation history documents belong, as a result of the search to the user.

Practically, when the input device 7 is operated by the user such as an operator or a problem-solving clerk at a call center to input an inquiry text indicating the inquiry content from the customer, and an instruction to search for a response example to the relevant inquiry, the search apparatus 1 searches the conversation history documents about inquiries whose content is similar to the relevant inquiry text, by means of the concept search.

Then, when the search apparatus 1 detects the conversation history documents about the inquiries whose content is most similar to the inquiry text, as a result of this search, it displays a search result screen that indicates a link to a screen displaying a text of the representative document for a cluster, to which the relevant conversation history documents belong, and links to respective screens displaying texts of the conversation history documents whose inquiry content is similar to that of the relevant representative document (for example, the conversation history documents corresponding to the respective nodes 21 connected with a node 21 of the representative document with the edges 22 as illustrated in FIG. 5), on the display device 8.

For example, in the case of an example of FIG. 7, when any one of the conversation history documents 24A to 24D is detected as a conversation history document whose content is similar to inquiry texts such as an inquiry text stating that "backup of server fails to be completed within specified time limit" and an inquiry text stating that "backup fails to be completed as scheduled," a search result screen that indicates a link to a screen displaying the text of the conversation history document 24D that is the representative document for the cluster to which the conversation history documents 24A to 24D belong, and links to the respective screens indicating the texts of the conversation history documents 24A to 24C whose inquiry content is similar to that of the conversation history document 24D will be displayed on the display device 8.

A conversation history document classification unit 19 and a search execution unit 13 are stored in the memory 3 for the search apparatus 1 and an inter-document relation information 16 is stored in the storage apparatus 4 as illustrated in FIG. 1 as means for implementing the above-described inter-conversation-history-document relation creation function and conversation history document search function (these two functions will be hereinafter collectively referred to as the data search function as considered proper).

The conversation history document classification unit 19 is a program having a function classifying the conversation history documents included in the conversation history document information stored in the storage apparatus 4 and is configured by including the document management unit 11 and the inter-document relation management unit 12.

The document management unit 11 is a module having a function that extracts the relation between the conversation history documents included in the conversation history document information. This document management unit 11 is configured by including a conversation history document management unit 30 and a conversation history document relation calculation unit 31.

The conversation history document management unit 30 is a module that manages the conversation history documents by, for example, writing data of the conversation history documents as the conversation history document information 15 to the storage apparatus 4, reading the data of the conversation history documents included in the relevant conversation history document information 15 to the work area 14 for the memory 3, or deleting unnecessary conversation history documents from the conversation history document information 15. Moreover, the conversation history document relation calculation unit 31 is a module that calculates the relation between the conversation history documents as the aforementioned similarity score.

Furthermore, the inter-document relation management unit 12 is a module having a function that classifies (clusters) the conversation history documents stored in the storage apparatus 4. This inter-document relation management unit 12 is configured by including a relation structure creation unit 32 and a relation structure analysis unit 33.

The relation structure creation unit 32 is a module that creates the graph 20 described earlier with reference to FIG. 5 on the basis of the similarity score between the conversation history documents as calculated by the conversation history document relation calculation unit 31 for the document management unit 11 and stores the created graph 20 as the inter-document relation information 16 in the storage apparatus 4. Moreover, the relation structure analysis unit 33 is a module having a function that classifies the conversation history documents into a plurality of clusters on the basis of the inter-document relation information 16 stored in the storage apparatus 4.

The search execution unit 13 is a program having a function that: searches the conversation history document information 15 for the conversation history documents whose inquiry content is similar to the inquiry text from the customer, which was given from the user; and displays a search result screen including a link to, for example, a screen for displaying the text of a representative document for a cluster, to which the detected conversation history documents belong, on the display device 8. This search execution unit 13 is configured by including a search text acceptance and analysis unit 34 and a document search unit 35; and the document search unit 35 is configured by further including a similar document search unit 36, a similar cluster detection unit 37, and a representative document extraction unit 38.

Among these components, the search text acceptance and analysis unit 34 is a module having a function that accepts the inquiry text of the inquiry from the customer, which is input by the user via the input device 7. Moreover, the similar document search unit 36 is a module having a function that searches the conversation history document information 15 for the conversation history documents similar to the inquiry text accepted by the search text acceptance and analysis unit 34.

Furthermore, the similar cluster detection unit 37 is a module having a function that identifies a cluster including the conversation history documents detected by the aforementioned search; and the representative document extraction unit 38 is a module having a function that, for example, extracts a representative document for each cluster on the basis of the analysis result of the relation structure analysis unit 33 for the inter-document relation management unit 12 and extracts the representative document for the cluster as identified by the similar cluster detection unit 37.

Incidentally, in the following explanation, a processing subject of various processing will be described as a "module"; however, it is a matter of course that the CPU 2 (FIG. 1) executes the relevant processing according to the module.

Meanwhile, the inter-document relation information 16 is information used to retain: the relation structure (graph structure) of the conversation history documents, which is created by the relation structure creation unit 32 for the inter-document relation management unit 12 and stored in the storage apparatus 4; and the results of clustering executed by the relation structure analysis unit 33 for the inter-document relation management unit 12.

This inter-document relation information 16 has a table structure including an edge ID column 16A, a start node ID column 16B, an end node ID column 16C, and a cluster number column 16D as illustrated in FIG. 8. Then, the edge ID column 16A stores an identifier (edge ID) assigned to each edge 22 of the graph 20 described earlier with reference to FIG. 5.

Furthermore, the start node ID column 16B stores an identifier assigned to a node 21 (hereinafter referred to as the node ID) connected to a start point side of the relevant edge 22; and the end node ID column 16C stores a node ID assigned to a node 21 connected to an end point side of the relevant edge 22.

However, since an undirected graph is used in this embodiment as the relation structure between the conversation history documents as is apparent from FIG. 5 and there is no concept of a start point and an end point of an edge 22, merely the node ID of either one of two nodes 21 connected to the relevant edge 22 is stored in the start node ID column 16B and the node ID of the other node 21 is stored in the end node ID column 16C and which one of the start point and the end point of the edge 22 the node 21 is connected does not have any particular meaning.

Furthermore, the cluster number column 16D stores an identification number (cluster number) of a cluster to which a conversation history document associated with the node 21 connected to the end point side of the relevant edge 22 belongs.

Incidentally, among information of each record (row) of the inter-document relation information 16, information of the edge ID column 16A, the start node ID column 16B, and the end node ID column 16C is registered by the conversation history document relation calculation unit 31 for the document management unit 11 and information of the cluster number column 16D is registered by the relation structure analysis unit 33 for the inter-document relation management unit 12 as described later.

(1-3) Inter-Conversation-History-Document Relation Creation Processing

Figure 9:
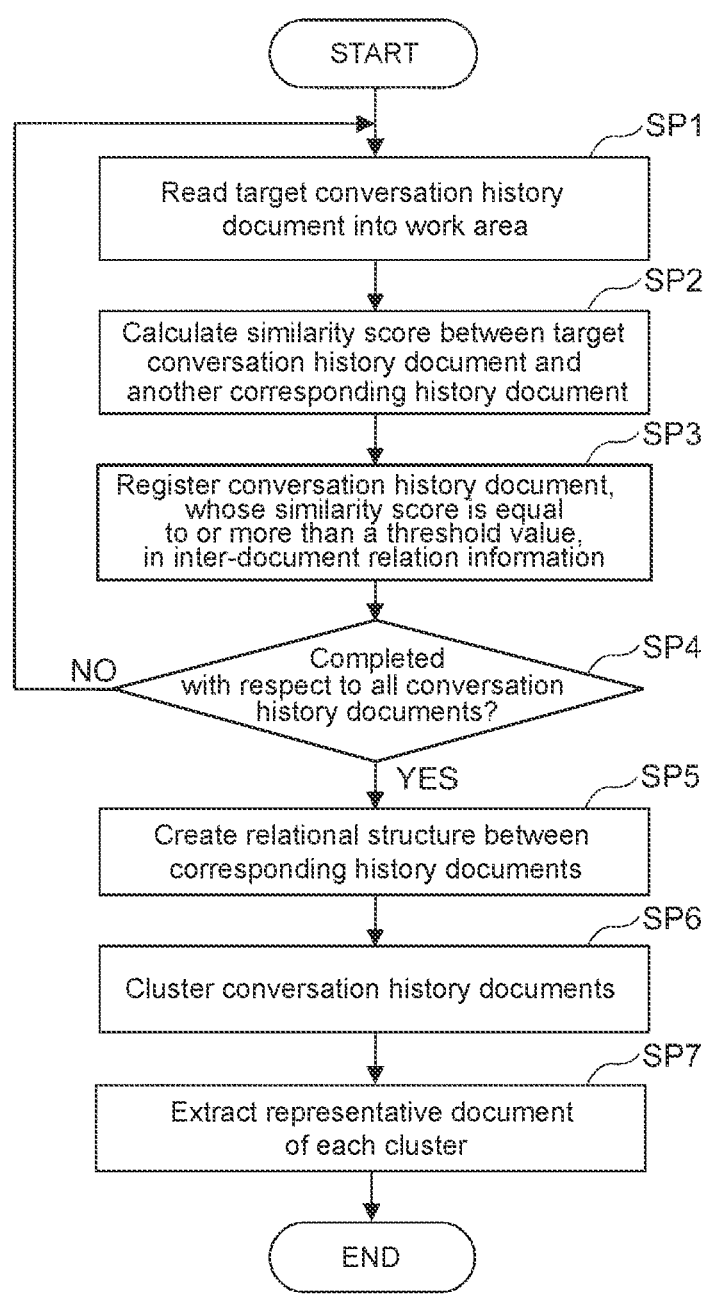
FIG. 9 is a flowchart illustrating a processing sequence for inter-conversation-history-document relation creation processing.

FIG. 9 illustrates a specific processing sequence for inter-conversation-history-document relation creation processing executed by the conversation history document classification unit 19 and the search execution unit 13 in association with the aforementioned inter-conversation-history-document relation creation function. This inter-conversation-history-document relation creation processing is executed regularly or irregularly upon receiving a processing execution instruction from the user.

Regarding the inter-conversation-history-document relation creation processing, the conversation history document management unit 30 for the document management unit 11 firstly reads one conversation history document, which is included in the conversation history document information 15 stored in the storage apparatus 4, to the work area 14 for the memory 3 and notifies the conversation history document relation calculation unit 31 to that effect (SP1).

After receiving such notification from the conversation history document management unit 30, the conversation history document relation calculation unit 31 compares character components between the conversation history document read to the work area 14 (hereinafter referred to as the target conversation history document) and each of all the conversation history documents other than the target conversation history document (the concept search) and calculates each similarity score (SP2). As a result, when the processing of this step SP2 is completed, a similarity score list 40 as illustrated in FIG. 10 is created in the work area 14 for the memory 3.

Next, the conversation history document relation calculation unit 31 registers the relation with the target conversation history document in the inter-document relation information 16 (FIG. 8) with respect to each of all the conversation history documents whose similarity score with the target conversation history document as calculated in step SP2 is equal to or higher than the similarity score threshold value (for example, 70) (SP3).

Specifically speaking, the conversation history document relation calculation unit 31 stores the identifier (node ID) of the node 21 corresponding to the target conversation history document in the start node ID column 16B (FIG. 8) of the inter-document relation information 16, also stores the node ID of the node 21 corresponding to the conversation history document, whose similarity score with the target conversation history document is equal to or higher than the similarity score threshold value, in the end node ID column 16C (FIG. 8) of the inter-document relation information 16, and stores the edge ID assigned to the edge 22 connecting the nodes 21, which are respectively associated with the target conversation history document and the conversation history document, in the edge ID column 16A of the relevant record of the inter-document relation information 16, thereby registering these conversation history documents in the inter-document relation information 16.

Furthermore, the conversation history document relation calculation unit 31 judges whether or not the execution of the processing from step SP1 to step SP3 has been completed by executing the processing on all the conversation history documents, which are included in the conversation history document information 15, as the target conversation history document (SP4).

Then, when a negative result is obtained in this judgment, the conversation history document relation calculation unit 31 notifies the conversation history document management unit 30 to that effect. Subsequently, the processing from step SP1 to step SP4 is repeated by sequentially switching the conversation history document, which is read by the conversation history document management unit 30 to the work area 14 for the memory 3 in step SP1, to another unprocessed conversation history document.

When an affirmative result is eventually obtained in step SP4 by completing the execution of the processing from step SP1 to step SP3 by executing the processing on all the conversation history documents included in the conversation history document information 15 as the target conversation history document, the relation structure creation unit 32 for the inter-document relation management unit 12 is notified to that effect. Then, the relation structure creation unit 32 which has received this notification creates the graph 20 described earlier with reference to FIG. 5 as the relation structure between the conversation history documents on the basis of the inter-document relation information 16 stored in the storage apparatus 4 and notifies the relation structure analysis unit 33 to that effect (SP5).

Then, the relation structure analysis unit 33 which has received this notification classifies the relevant conversation history documents into a plurality of clusters by executing feature value analysis (so-called clustering) of character strings on each conversation history document corresponding to each of two nodes 21 connected via each edge 22 by referring to the graph 20 created in step SP5. Then, the relation structure analysis unit 33 stores the cluster number of a cluster, to which the conversation history document associated with the node 21 connected to the end point side of the relevant edge 22, in the cluster number column 16D (FIG. 8) of each record of the inter-document relation information 16 on the basis of this clustering results and then notifies the representative document extraction unit 38 for the search execution unit 13 to that effect (SP6).

After receiving such notification from the relation structure analysis unit 33, the representative document extraction unit 38 extracts a representative document for each cluster created in step SP6 (SP7). In a case of this embodiment, the representative document extraction unit 38 extracts a conversation history document corresponding to a node 21 which has a largest number of connected edges 22 within the relevant cluster (the node 21 whose degree centrality by centrality analysis is the highest), with respect to each cluster as a representative document for the relevant cluster.

The representative document for each cluster is extracted as a result of the above-described processing and then this inter-conversation-history-document relation creation processing is terminated.

(1-4) Conversation History Document Search Processing

Figure 11:
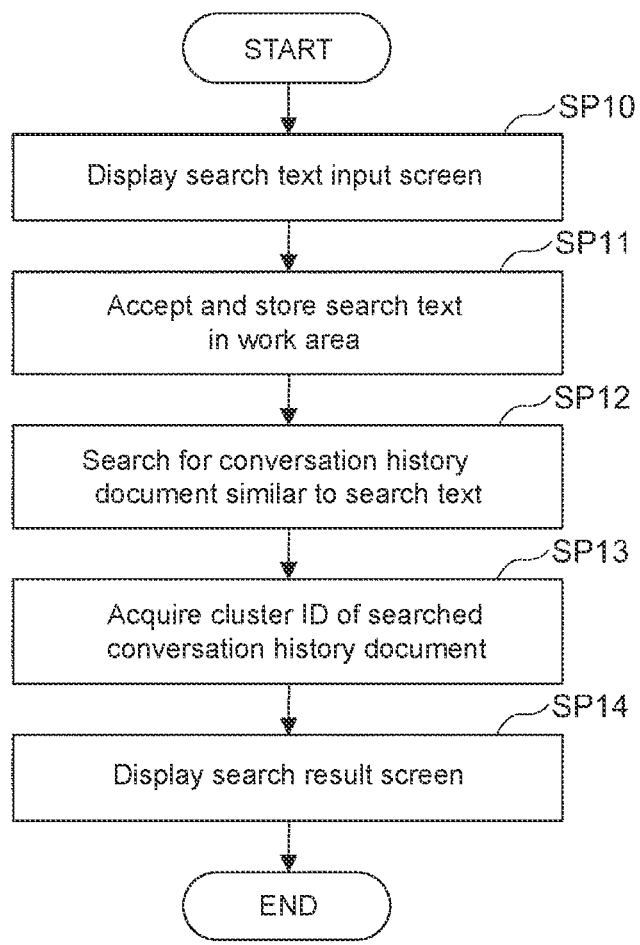
FIG. 11 is a flowchart illustrating a processing sequence for conversation history document search processing.

Meanwhile, FIG. 11 illustrates a specific processing sequence for conversation history document search processing executed by the search execution unit 13 in association with the aforementioned conversation history document search function. This conversation history document search processing is executed upon receipt of a search instruction from the user.

Figure 12:
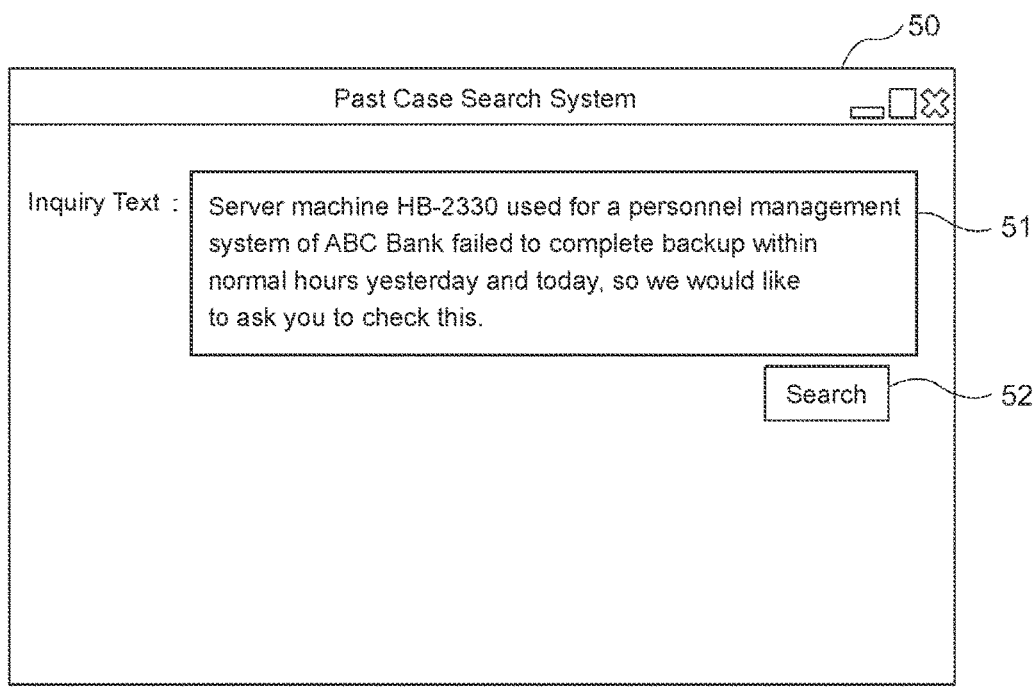
FIG. 12 is a schematic diagram illustrating a configuration example of a search text input screen.

Practically, after receiving a request to display a search text input screen from the user via the input device 7, the search text acceptance and analysis unit 34 (FIG. 1) for the search execution unit 13 displays a search text input screen 50 as illustrated in FIG. 12 on the display device 8 (SP10).

This search text input screen 50 is a screen for the user to input an inquiry text from the customer as a search text and is configured by including an inquiry text input field 51 and a search button 52. Then, on the search text input screen 50, the user can issue an instruction to the search apparatus 1 to execute a search of the inquiry text as the search text by inputting the inquiry text from the customer to the inquiry text input field 51 by utilizing the input device 7, and then clicking the search button 52.

Then, after the inquiry text is input to the search text input screen 50 and the search button 52 is clicked as described above, the search text acceptance and analysis unit 34 incorporates the inquiry text as the search text and stores data of the incorporated search text in the work area 14 for the memory 3 (SP11). Then, the search text acceptance and analysis unit 34 notifies the similar document search unit 36 for the document search unit 35 to that effect.

After receiving such notification from the search text acceptance and analysis unit 34, the similar document search unit 36 searches for the conversation history documents including an inquiry text of the content similar to the search text whose data is stored in the work area 14 for the memory 3, by means of the concept search and notifies the similar cluster detection unit 37 (FIG. 1) of the search results (SP12).

Furthermore, after receiving such notification from the similar document search unit 36, the similar cluster detection unit 37 acquires the cluster ID of a cluster, to which the conversation history documents detected in step SP12 belong, from the inter-document relation information 16 (FIG. 1) (SP13) and notifies the representative document extraction unit 38 of the acquired cluster ID (SP14).

After receiving such cluster ID from the similar cluster detection unit 37, the representative document extraction unit 38 acquires the representative document for the cluster, to which the relevant cluster ID is assigned, from among the representative documents of the respective clusters extracted in step SP7 of the inter-conversation-history-document relation creation processing described earlier with reference to FIG. 9. Then, the representative document extraction unit 38 displays the search result screen indicating a link to a screen displaying the acquired representative document and links to respective screens displaying some conversation history documents whose inquiry content is similar to that of the relevant representative document, on the display device 8 (SP14).

Subsequently, this conversation history document search processing is terminated.

(1-5) Advantageous Effects of this Embodiment

The search apparatus 1 according to this embodiment as described above: classifies conversation history documents into a plurality of clusters according to the content of the conversation history documents; extracts a conversation history document, which has a largest relation number with other conversation history documents within the relevant cluster, with respect to each cluster as a representative document for the relevant cluster; and searches for the conversation history documents having a relation with the inquiry text upon search of the conversation history documents similar to the inquiry text and presents the representative document for the cluster, to which the conversation history documents detected by the search belong, as the search result to the user.

Therefore, this search apparatus 1 can present the conversation history document of the inquiry content deeply related to the inquiry text without depending on, for example, the expression form of the inquiry content of the inquiry text, thereby making it possible to enhance the response accuracy of the search result. Accordingly, an effective response to the inquiry from the customer can be presented in a short period of time by using this search apparatus 1.

(2) Second Embodiment

Referring to FIG. 1, the reference numeral 60 represents a search apparatus according to a second embodiment as a whole. This search apparatus 60 is configured in the same manner as the search apparatus 1 according to the first embodiment, except that a weight according to strength of the relation between the conversation history documents respectively associated with two nodes 21 connected by the relevant edge 22 is set to each edge 22 of the graph 20 (FIG. 5) created by the inter-conversation-history-document relation creation processing and this weight is used to extract a representative document for each category of the conversation history documents.

Practically, in a case of the search apparatus 60 according to this embodiment, inter-document relation information 61 is provided with a weight column 61E in addition to an edge ID column 61A, a start node ID column 61B, an end node ID column 61C, and a cluster number column 61D as illustrated in FIG. 13. Then, while the same information as the information stored in the edge ID column 16A, the start node ID column 16B, the end node ID column 16O, and the cluster number column 16D of the inter-document relation information 16 according to the first embodiment is stored respectively in the edge ID column 61A, the start node ID column 61B, the end node ID column 61C, and the cluster number column 61D, the weight assigned to the relevant edge 22 (FIG. 5) is stored in the weight column 61E.

In a case of this embodiment, the weight set to an edge 22 is set as $\frac{1}{10}$ of the similarity score between the conversation history documents respectively associated with two nodes 21 connected by the relevant edge 22. However, the weight of each edge can be set by any means other than this. For example, when the user prepares a response to an inquiry from the customer, the weight of each edge 22 may be set by: storing the user's history lookup process, that is, in which order the user refers to the conversation history documents when referring to the plurality of conversation history documents other than the representative document presented by the search apparatus 60; and setting a high weight to the edge 22 between the conversation history documents which are often followed (that is, to both of which the reference is often made together). In this case, the number of times the reference is made to the conversation history documents together is counted and the count value is set as the weight as it is.

Figure 14:
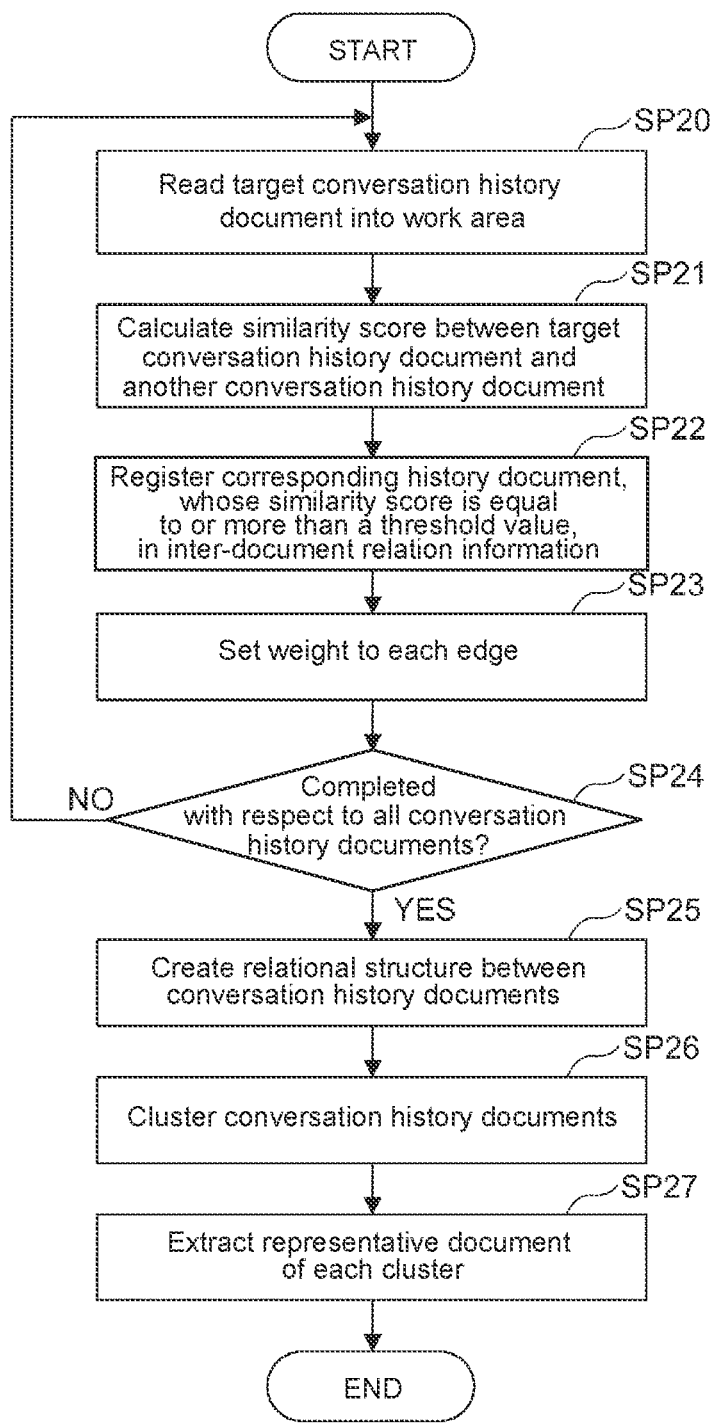
FIG. 14 is a flowchart illustrating a processing sequence for inter-conversation-history-document relation creation processing according to the second embodiment.

FIG. 14 illustrates a specific processing sequence for inter-conversation-history-document relation creation processing according to this embodiment executed by using the inter-document relation information 61 having the aforementioned structure. This inter-conversation-history-document relation creation processing is started regularly or upon receipt of a processing execution instruction from the user in the same manner as the inter-conversation-history-document relation creation processing (FIG. 9) according to the first embodiment.

Then, regarding the inter-conversation-history-document relation creation processing in this embodiment, processing from step SP20 to step SP22 is executed in the same manner as from step SP1 to step SP3 of the inter-conversation-history-document relation creation processing according to the first embodiment.

Subsequently, the conversation history document relation calculation unit 31 calculates weight W according to the expression indicated below where S represents a value of the similarity score between the conversation history documents respectively associated with two nodes 21 connected by the relevant edge 22 with respect to each edge 22 registered in the inter-document relation information 61 in step SP22.

[Math. 1]

$$W=S/10 \tag{1}$$

Then, the conversation history document relation calculation unit 31 stores the calculated weight of each edge 22 in the weight column 61E of the relevant record of the inter-document relation information 61 (SP23).

Subsequently, regarding the inter-conversation-history-document relation creation processing in this embodiment, processing from step SP24 to step SP26 is executed in the same manner as from step SP4 to step SP6 of the inter-conversation-history-document relation creation processing according to the first embodiment.

Furthermore, a representative document extraction unit 64 for a document search unit 63 of a search execution unit 62 then extracts a document which becomes a center of each cluster created in step SP26 as a representative document (SP27). In a case of this embodiment, the representative document extraction unit 64 extracts a conversation history document corresponding to a node 21 which has the largest average value of the weight set to each connected edge within the relevant cluster, as a representative document for the relevant cluster with respect to each cluster.

As a result of the above-described processing, the representative document for each cluster is extracted in consideration of the weight of the edge 22. Subsequently, this inter-conversation-history-document relation creation processing is terminated.

Regarding the search apparatus 60 according to this embodiment as described above, the weight is set to each edge 22 of the graph 20 according to the strength of the relation between the conversation history documents associated respectively with two nodes 21 connected by the relevant edge 22. Accordingly, this search apparatus 60 can represent the relation between the conversation history documents more precisely and, therefore, can further enhance the accuracy of the search result more than the search apparatus 1 according to the first embodiment.

(3) Third Embodiment

The second embodiment has explained about setting the weight to each edge 22 (FIG. 5) of the graph 20 (FIG. 5) created on the basis of the inter-document relation information 16. Contrarily, in this embodiment, a weight according to reference frequency of the relevant conversation history document is set to each conversation history document and degree centrality of each conversation history document as calculated by means of centrality analysis is corrected on the basis of the weight of each relevant conversation history document, and then a representative document is extracted on the basis of the corrected degree centrality of each conversation history document. By doing so, the representative document which matches the actual situation can be extracted.

Figure 15:
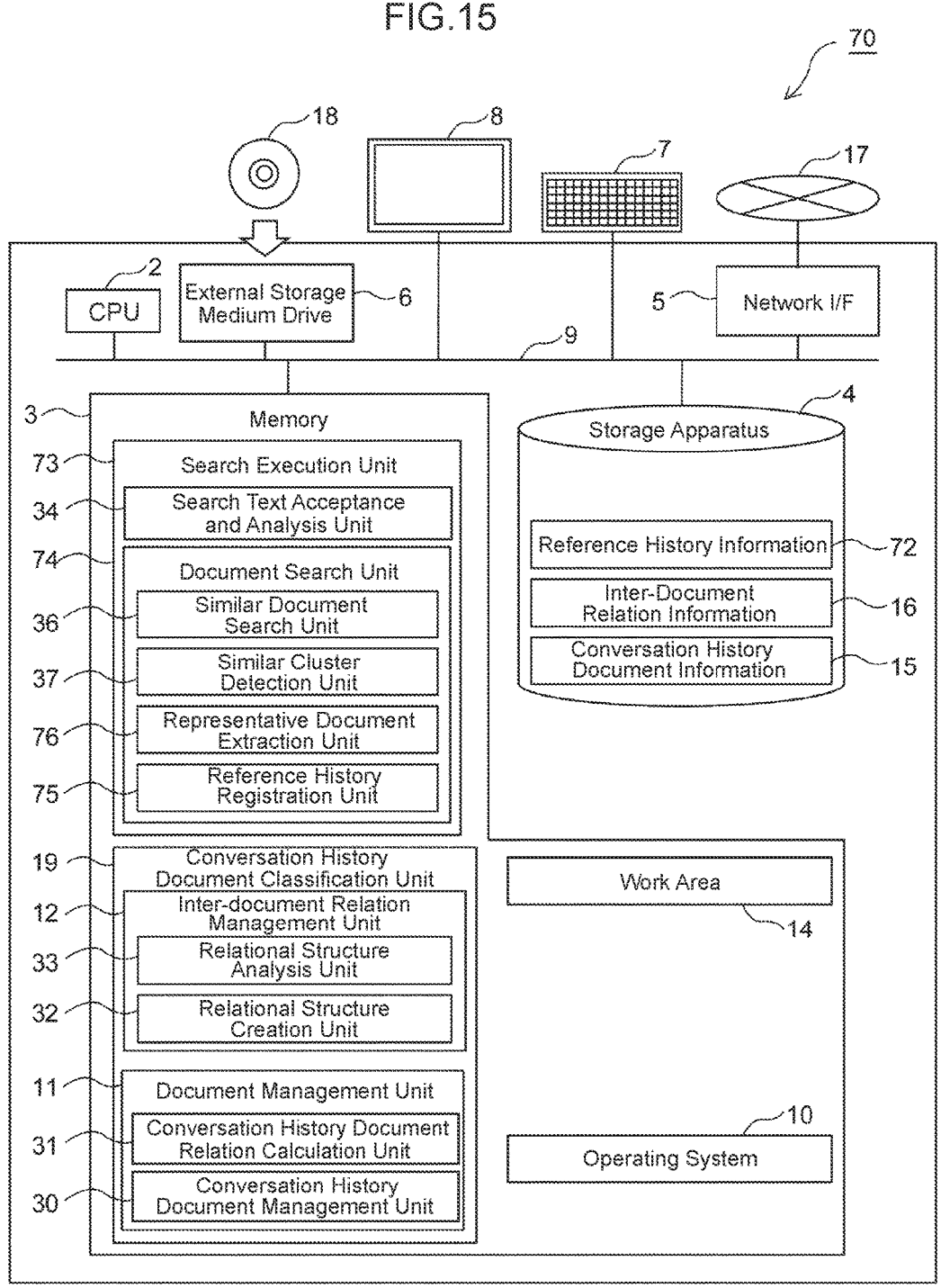
FIG. 15 is a block diagram illustrating an overall configuration of a search apparatus according to a third embodiment.

FIG. 15 in which the same reference numerals as those in FIG. 1 are assigned to parts corresponding to those in FIG. 1 illustrates the configuration of a search apparatus 70 according to this embodiment. The search apparatus 70 according to this embodiment is configured in the same manner as the search apparatus 1 according to the first embodiment, except that reference history information 72 is stored, in addition to the conversation history document information 15 and the inter-document relation information 16, in the storage apparatus 4, a document search unit 74 for a search execution unit 73 stored in the memory 3 is provided with a reference history registration unit 75, and a representative document extraction unit 76 for the document search unit 74 has a different function.

FIG. 16 illustrate a configuration example of the reference history information 72. The reference history information 72 is information used to manage the frequency of reference made by the user with respect to each conversation history document and has a table structure composed of a document ID column 72A and a reference frequency column 72B. Then, the document ID column 72A stores an identifier of each conversation history document (hereinafter referred to as the document ID) and the reference frequency column 72B stores the reference frequency of the relevant conversation history document up to present. This reference frequency is counted up by one by the reference history registration unit 75 for the document search unit 74 every time the reference is made to the relevant conversation history document.

Figure 17:
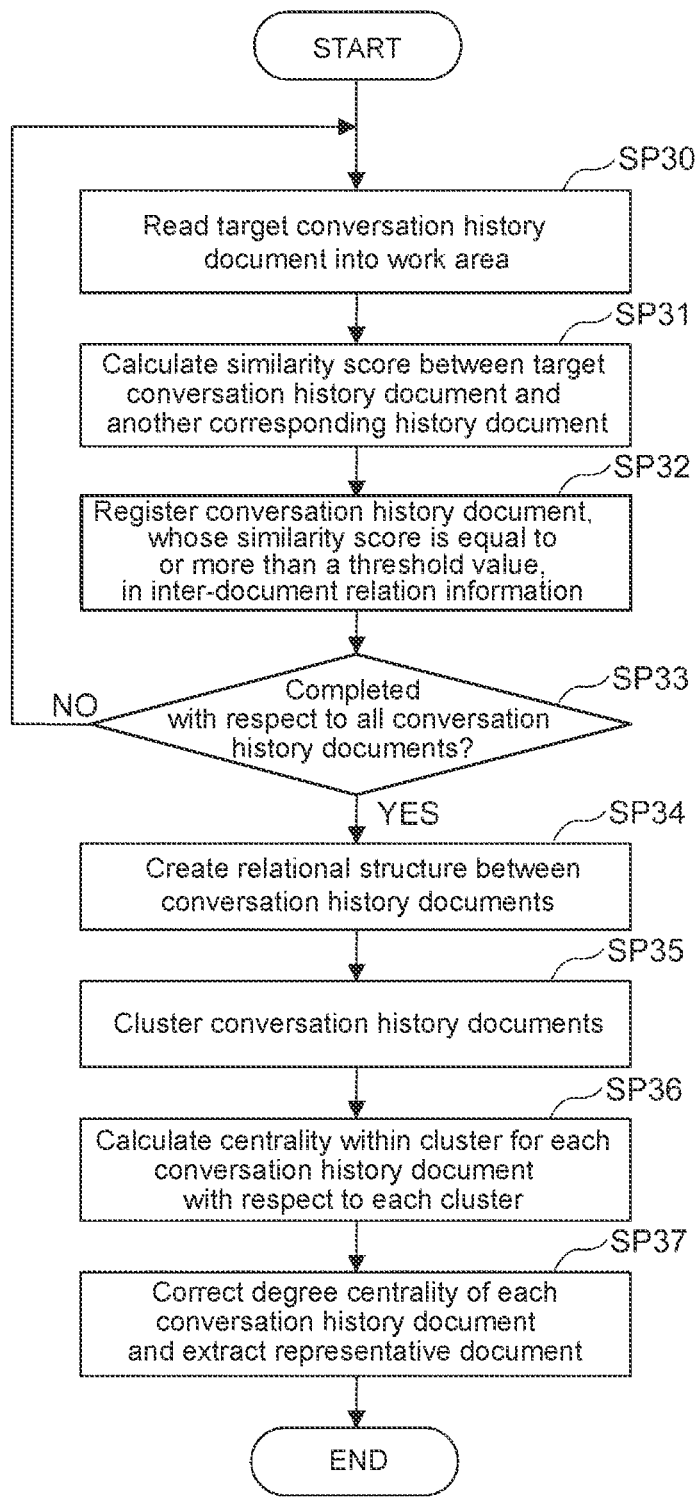
FIG. 17 is a flowchart illustrating a processing sequence for inter-conversation-history-document relation creation processing according to the third embodiment.

Meanwhile, FIG. 17 illustrates a processing sequence for inter-conversation-history-document relation creation processing executed by the search apparatus 70 according to this embodiment. Regarding this inter-conversation-history-document relation creation processing, processing from step SP30 to step SP35 is executed in the same manner as from step SP1 to step SP6 of the inter-conversation-history-document relation creation processing according to the first embodiment described earlier with reference to FIG. 9.

Subsequently, the representative document extraction unit 76 calculates degree centrality of each conversation history document for each cluster created in step SP35 (SP36). Moreover, after normalizing (by means of division by the total number of nodes) the degree centrality of each conversation history document as calculated in step SP36 for each cluster, the representative document extraction unit 76 corrects the normalized degree centrality of each conversation history document on the basis of the reference history information 72 and extracts a representative document for the relevant cluster on the basis of the correction result (SP37).

Specifically speaking, the representative document extraction unit 76 calculates a corrected value C' of the normalized degree centrality of each conversation history document according to the expression indicated below, where C represents the normalized degree centrality of the conversation history document as calculated in step SP36. R represents the reference frequency of the relevant conversation history document which can be obtained from the reference history information 72, and TR represents a total value of the reference frequencies of all conversation history documents to which the relevant conversation history document belongs.

[Math. 2]

$$C = C \times \{1 + (R/TR)\} \qquad (2)$$

Then, the representative document extraction unit 76 extracts a conversation history document which has the largest corrected value C' of the normalized degree centrality within the cluster, as the representative document for the relevant cluster.

For example, when values of the normalized degree centrality of the respective conversation history documents as calculated in step SP36 with respect to a certain cluster are as indicated in FIG. 18 and a total value of the reference frequencies of the cluster to which these conversation history documents belong is 100 times, the values of the normalized degree centrality of these conversation history documents are corrected respectively in step SP37 as indicated in FIG. 19. Accordingly, although the normalized degree centrality of a conversation history document whose document ID is "20140231_0232" is the highest in a stage before the correction (FIG. 18), the normalized degree centrality of a conversation history document whose document ID is "20131005_0002" becomes the highest in a stage after the correction (FIG. 19). Thus, in step SP37, this conversation history document whose document ID is "20131005_0002" is extracted as a representative document for this cluster.

Figure 20:
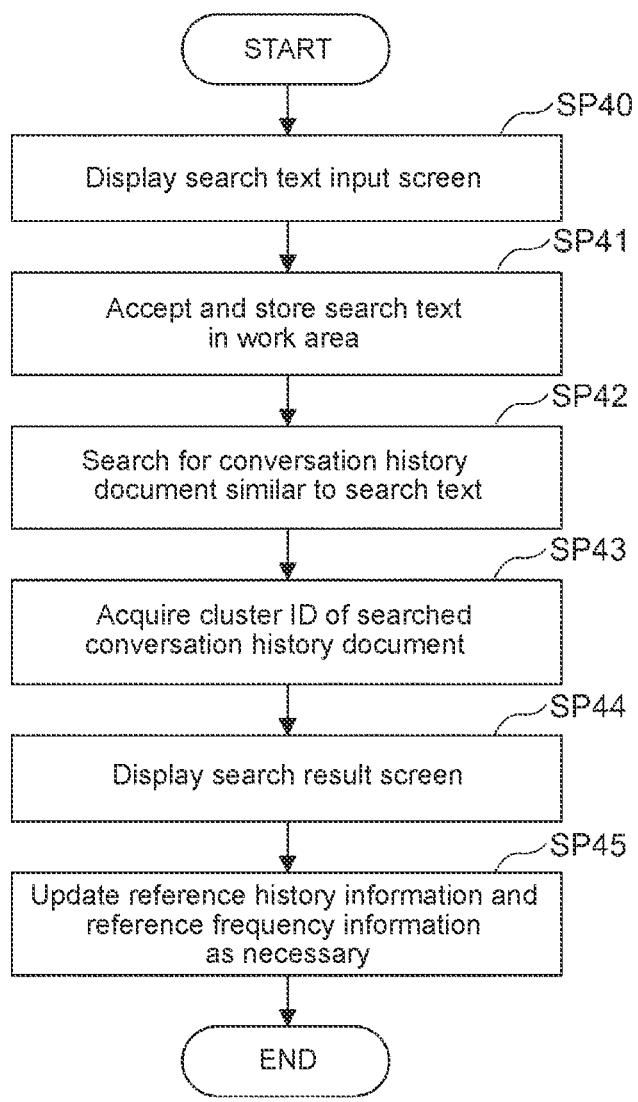
FIG. 20 is a flowchart illustrating a processing sequence for conversation history document search processing according to the third embodiment.

FIG. 20 illustrates a processing sequence for conversation history document search processing executed by the search apparatus 70 according to this embodiment. Regarding this conversation history document search processing, processing from step SP40 to step SP44 is executed in the same manner as the processing from step SP10 to step SP14 of the conversation history document search processing according to the first embodiment as described earlier with reference to FIG. 11. As a result, a search result screen including respective links to screens respectively displaying some conversation history documents (including the representative document) whose content is similar to the inquiry text input to the search text input screen 50 (FIG. 12) is displayed on the display device 8 (FIG. 15) as described earlier.

Subsequently, the reference history registration unit 75 for the document search unit 74 monitors the user's operation on the search result screen; and when any one of the links to the screens displaying the conversation history documents is clicked on the relevant search result screen, the reference history registration unit 75 updates the reference history information 72 to increase the reference frequency of the relevant conversation history document by one (SP45).

Subsequently, when this search result screen is closed, this conversation history document search processing is terminated.

The search apparatus 70 according to this embodiment as described above: sets the weight according to the reference frequency of each conversation history document to that conversation history document; corrects the degree centrality of each conversation history document, which is calculated by means of the centrality analysis, on the basis of the weight of the relevant conversation history document; and then extracts the representative document on the basis of the corrected degree centrality of each conversation history document. Therefore, this search apparatus 70 can extract the representative document which matches the actual situation and, therefore, can further enhance the accuracy of the search result more than the search apparatus 1 according to the first embodiment.

(4) Fourth Embodiment

With the search apparatus 1 according to the first embodiment, search targets of the concept search (targets for comparison of character components with the search text) for the conversation history document search processing (FIG. 11) are all the conversation history documents. However, when all the conversation history documents are used as the search targets of the concept search in this way, there is a possibility that processing time may become long depending on the number of the conversation history documents.

Thus, in this embodiment, only representative documents of respective categories of the conversation history documents are used as the search targets of the concept search for such conversation history document search processing. By doing so, it is possible to reduce the number of the conversation history documents used as the search targets and increase the speed of the search.

Figure 21:
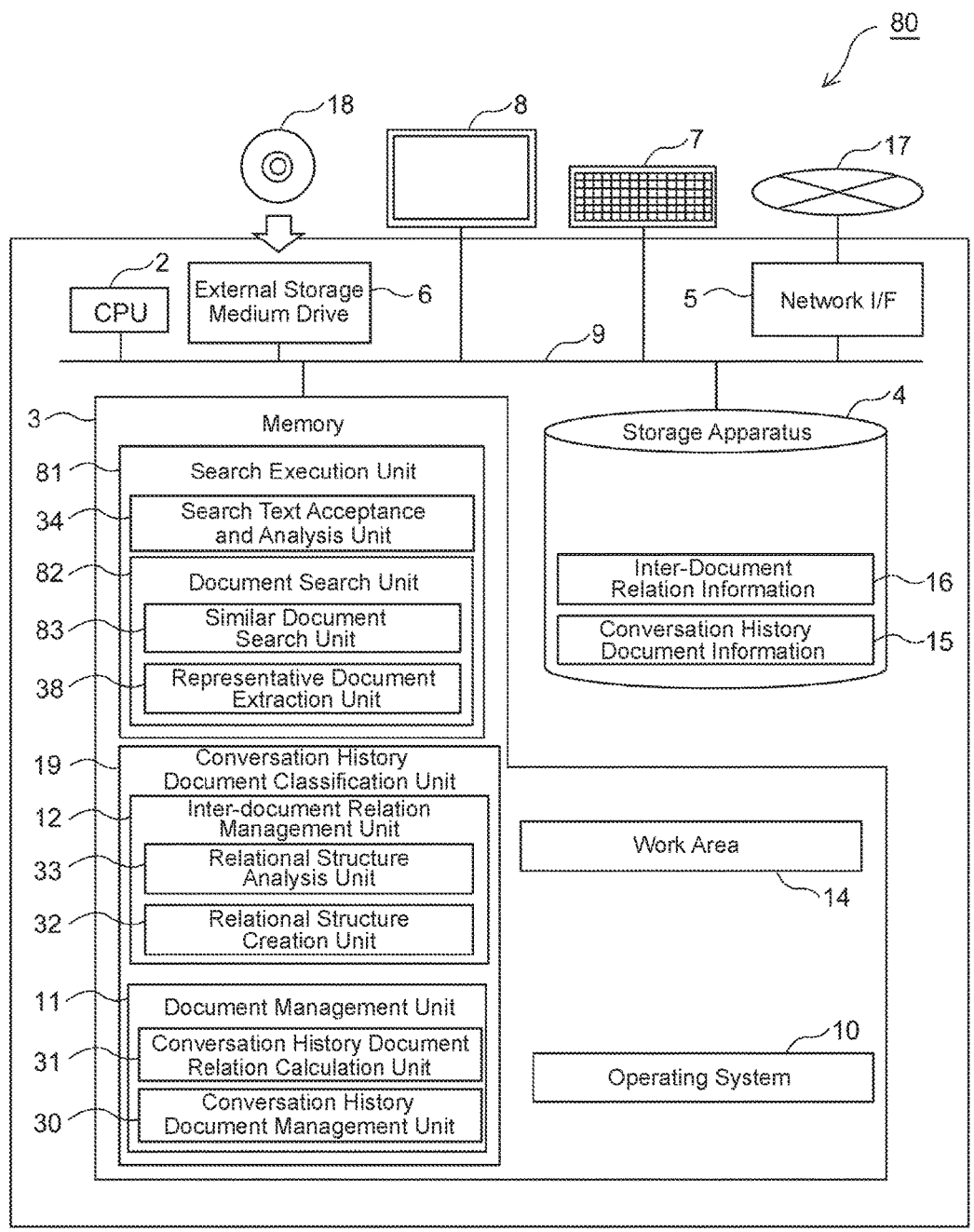
FIG. 21 is a block diagram illustrating an overall configuration of a search apparatus according to a fourth embodiment.

FIG. 21 in which the same reference numerals as in FIG. 1 are assigned to parts corresponding to those in FIG. 1 illustrates the configuration of a search apparatus 80 according to this embodiment. This search apparatus 80 is configured in the same manner as the search apparatus 1 according to the first embodiment, except that a document search unit 82 for a search execution unit 81 stored in the memory 3 is configured of only a similar document search unit 83 and a representative document extraction unit 38.

Figure 22:
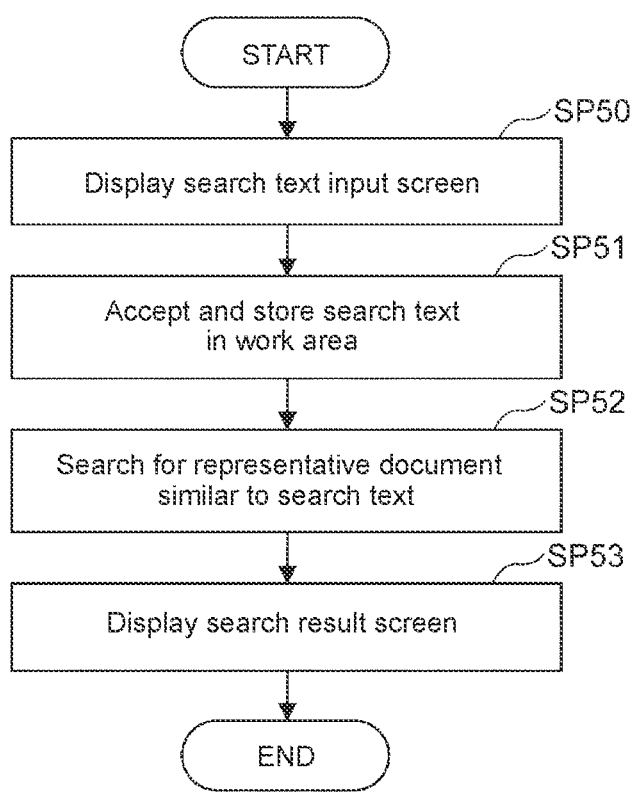
FIG. 22 is a flowchart illustrating a processing sequence for conversation history document search processing according to a fourth embodiment.

FIG. 22 illustrates a specific processing sequence for conversation history document search processing according to this embodiment. This conversation history document search processing is executed upon receipt of a search instruction from the user.

Then, regarding the conversation history document search processing according to this embodiment, processing in step SP50 and step SP51 is executed in the same manner as the processing in step SP10 and step SP11 of the conversation history document search processing (FIG. 11) according to the first embodiment.

Next, the similar document search unit 83 searches for a representative document similar to the search text whose data is stored in the work area 14 for the memory 3, by means of the concept search (SP52). Incidentally, as for a concept search method used under this circumstance, for example, it is possible to apply a search method of applying a condition like a WHERE phrase of SQL (Structured Query Language) as well as a method of creating a set of documents consisting of only representative documents in advance and performing the search targeted on only such set of documents.

Subsequently, the similar document search unit 83 displays a search result screen indicating a link to a screen displaying the representative document detected by the search and links to respective screens displaying some other conversation history documents whose inquiry content is similar to that of the relevant representative document, on the display device 8 (SP53). Then, this conversation history document search processing is terminated.

The search apparatus 80 according to this embodiment as described above executes the concept search targeted on only the representative document for each category of the conversation history documents during the conversation history document search processing. Therefore, this search apparatus 80 can reduce the number of the conversation history documents used as the search targets and, therefore, further increase the search speed more than the search apparatus 1 according to the first embodiment.

(5) Other Embodiments

Incidentally, the aforementioned first to fourth embodiments have described the case where the graph created by the relation structure analysis unit 33 for the inter-document relation management unit 12 is the undirected graph; however, the present invention is not limited to this example and the graph created by the relation structure analysis unit 33 may be, for example, a directed graph 90 as illustrated in FIG. 23. In this case, a direction of an edge 92 is a direction towards a node 91 corresponding to a conversation history document detected by the search from the node 91 corresponding to a conversation history document which is a search source; and as for degree centrality of each node 91, in-degree centrality counting the number of edges 92 directed towards the present node 91 may be applied.

Furthermore, the aforementioned first to fourth embodiments have described the case where the degree centrality is used as a method for extracting a representative document for each cluster of the conversation history documents; however, the present invention is not limited to this example and the representative document for each cluster may be extracted by using, for example, centrality other than the degree centrality, such as proximity centrality indicating a point which is close to any points in a graph or medium centrality indicating how important role this has in a graph. In this case, a conversation history document which has a high calculated value representing the relation with other conversation history documents within the relevant cluster may be extracted as the representative document for each cluster.

Furthermore, the aforementioned first to fourth embodiments have described the case where information of each cluster of the conversation history documents is stored in a so-called relational database; however, the present invention is not limited to this example and the information of each cluster may be directly retained in, for example, a graph database. However, when each conversation history document is classified into a plurality of clusters, such classification can be conducted at a higher speed by storing the information of each cluster in the relational database.

Furthermore, the aforementioned first to fourth embodiments have described the case where the inter-conversation-history-document relation creation processing is executed regularly or irregularly upon receipt of the processing execution instruction from the user; however, the present invention is not limited to this example and, for example, the inter-conversation-history-document relation creation processing may be executed every time a conversation history document is added; and other wide variety of timings can be applied as timing to execute the inter-conversation-history-document relation creation processing.

Furthermore, the aforementioned first to fourth embodiments have described the case where the conversation history document classification unit 19 and the search execution units 13, 62, 73 and 81 are created as separate programs; however, the present invention is not limited to this example and they may be configured as one program.

Furthermore, the aforementioned second embodiment has described the case where the weight set to an edge 22 is ¹⁄₁₀ of the similarity score; however, the present invention is not limited to this example and other wide variety of setting methods can be applied as a method of setting the weight of the edge 22.

Furthermore, the aforementioned third embodiment has described the case where the number of times a conversation history document is browsed is counted as the reference frequency of the relevant conversation history document; however, the present invention is not limited to this example and the number of times a conversation history document is actually copied and pasted and used as a response to an inquiry (the number of times it is copied) may be counted as the reference frequency of the relevant conversation history document. As a result of doing so, for example, when a conversation history document other than the representative document is used as a response to a new inquiry more often than the representative document, the reference frequency of the relevant conversation history document increases and the relevant conversation history document will be extracted as a next representative document. Therefore, it is possible to provide the user with information (the search results for new inquiries from customers) that matches the actual situation more closely.

Furthermore, instead of automatic counting of the number of times the conversation history documents are used for responses to inquiries from customers by the search apparatus 70, for example, check boxes may be provided on the search result screen by associating the check boxes respectively with a link to a screen displaying a representative screen, which is displayed on the search result screen, and links to screens displaying other conversation history documents, and the user may check the check box(es) corresponding to the conversation history document(s) which is actually used for an inquiry from a customer, and the number of checks in the check boxes may be counted for each conversation history document.

Furthermore, the aforementioned third embodiment has described the case where after the degree centrality of each conversation history document is normalized, the normalized degree centrality of each conversation history document is corrected on the basis of the reference history information 72 and a representative document for the relevant each cluster is extracted on the basis of the corrected result; however, the present invention is not limited to this example and the degree centrality of each conversation history document may be corrected on the basis of the reference history information 72 without normalizing the degree centrality of each conversation history document, and a representative document for the relevant each cluster may be extracted on the basis of the corrected result.

INDUSTRIAL APPLICABILITY

The present invention can be applied to a wide variety of search apparatuses for searching documents.

REFERENCE SIGNS LIST

1, 60, 70 and 80 search apparatus
2 CPU
3 memory
4 storage apparatus
7 input device
8 display device
11 document management unit
12 inter-document relation management unit
13, 62, 73 and 81 search execution unit
15 conversation history document information 16 and 61 inter-document relation information
19 conversation history document classification unit
20 and 90 graph
21 and 91 node
22 and 92 edge
23 cluster
30 conversation history document management unit
24A to 24D conversation history documents
25A and 25B inquiry text
31 conversation history document relation calculation unit
32 relation structure creation unit
33 relation structure analysis unit
34 search text acceptance and analysis unit
35, 74 and 82 document search unit
36 and 83 similar document search unit
37 similar cluster detection unit
38, 64 and 76 representative document extraction unit
40 similarity score list
50 search text input screen
72 reference history information
75 reference history registration unit

The invention claimed is:

1. A search method executed on a search apparatus for searching among a plurality of conversation history documents, each of which includes an inquiry from a customer and a response to the inquiry, for the conversation history documents whose content of the inquiry is similar to an inquiry text representing content of a new inquiry from the customer,
the search method comprising the steps of:
classifying, by the search apparatus, the plurality of conversation history documents into a plurality of clusters in accordance with contents;
extracting, by the search apparatus, a conversation history document from each of the clusters as a representative document by using a similarity score among a plurality of conversation history documents in each of the clusters; and
searching, by the search apparatus, for first conversation history documents having a relation with a first inquiry and presenting, as a result of the search, a first representative document for a first cluster, to which the first conversation history documents detected by the search belong,
wherein the classifying step includes:
a conversation history document relation calculation step of calculating a relation between the conversation history documents;
a relation structure creation step of creating a relation structure of the conversation history documents on the basis of the calculated relation between the conversation history documents; and
a conversation history document classification step of classifying the plurality of conversation history documents into the plurality of clusters on the basis of the created relation structure of the conversation history documents.

2. The search method according to claim 1,
wherein in the conversation history document relation calculation step, the relation between the conversation history documents is calculated as a numerical value representing a degree of similarity between the conversation history documents by a concept search for comparing character components of the conversation history documents.

3. The search method according to claim 1,
wherein in the relation structure analysis step, each of the conversation history documents is classified into the plurality of clusters by means of clustering on the basis of each feature of character strings included in the conversation history documents.

4. The search method according to claim 1,
wherein in the searching step, the first conversation history document which has a high similarity score as compared with the other first conversation history documents within the first cluster is extracted as the first representative document for the first cluster.

5. The search method according to claim 4,
wherein the first conversation history document which has a highest similarity score as compared with the other first conversation history documents within the first cluster includes a first response, wherein the number of conversation history documents, in the first cluster, which includes the first response is larger than the number of conversation history documents, in the first cluster, which includes other responses.

6. The search method according to claim 4,
wherein the classifying step includes:
a conversation history document relation calculation step of calculating a relation between the conversation history documents;
a relation structure creation step of creating a relation structure of the conversation history documents on the basis of the calculated relation between the conversation history documents; and
a conversation history document classification step of classifying the plurality of conversation history documents into the plurality of clusters on the basis of the created relation structure of the conversation history documents;
wherein in the relation structure creation step, a graph is created as the relation structure of the conversation history documents;
wherein in the conversation history document relation calculation step, a weight according to strength of the calculated relation between the conversation history documents is set to each of edges constituting the graph; and
wherein in the relation structure analysis step, the first representative document for the first cluster is extracted on the basis of the weight which is set to each of the edges.

7. The search method according to claim 4,
wherein reference frequency of each of the conversation history documents is managed; and
wherein in the extracting step, the representative document is extracted on the basis of the reference frequency.

8. The search method according to claim 1,
wherein in the searching step, the first conversation history documents having the relation with the first inquiry are searched for the first representative document, as a search target, for the first cluster.

9. A search apparatus for searching among a plurality of conversation history documents, each of which includes an inquiry from a customer and a response to the inquiry, for the conversation history documents whose content of the inquiry is similar to an inquiry text representing content of a new inquiry from the customer, the search apparatus comprising:
a conversation history document classification unit that classifies the plurality of conversation history documents into a plurality of clusters in accordance with contents;
a representative document extraction unit that extracts a conversation history document from each of the clusters as a representative document by using a similarity score among a plurality of conversation history documents in each of the clusters; and
a document search unit that searches for first conversation history documents having a relation with a first inquiry and presents, as a result of the search, a first representative document for a first cluster, to which the first conversation history documents detected by the search belong,
wherein the conversation history document classification unit includes:
a conversation history document relation calculation unit that calculates a relation between the conversation history documents;
a relation structure creation unit that creates a relation structure of the conversation history documents on the basis of the calculated relation between the conversation history documents; and
a conversation history document classification unit that classifies the plurality of conversation history documents into the plurality of clusters on the basis of the created relation structure of the conversation history documents.

10. A storage medium storing a program to be executed by a search apparatus for searching among a plurality of conversation history documents, each of which includes an inquiry from a customer and a response to the inquiry, for the conversation history documents whose content of the inquiry is similar to an inquiry text representing content of a new inquiry from the customer,
wherein the program causes the search apparatus to execute processing including:
a first step of classifying the plurality of conversation history documents into a plurality of clusters in accordance with contents;
a second step of extracting a conversation history document from each of the clusters as a representative document by using a similarity score among a plurality of conversation history documents in each of the clusters; and
a third step of searching for first conversation history documents having a relation with a first inquiry and presenting, as a result of the search, a first representative document for a first cluster, to which the first conversation history documents detected by the search belong,
wherein the first step includes:
a fourth step of calculating a relation between the conversation history documents;
a fifth step of creating a relation structure of the conversation history documents on the basis of the calculated relation between the conversation history documents; and
a sixth step of classifying the plurality of conversation history documents into the plurality of clusters on the basis of the created relation structure of the conversation history documents.

* * * * *